(12) United States Patent
Meylan et al.

(10) Patent No.: US 12,349,003 B2
(45) Date of Patent: Jul. 1, 2025

(54) MODIFYING A CONFIGURATION OF A RADIO BEARER BASED ON A REQUEST FOR QUALITY OF SERVICE (QOS) FOR A COMMUNICATION FLOW

(71) Applicant: QUALCOMM Incorporated, San Diego, CA (US)

(72) Inventors: Arnaud Meylan, San Diego, CA (US); Pulkit Hanswal, San Diego, CA (US); Leena Zacharias, San Jose, CA (US); Feilu Liu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 89 days.

(21) Appl. No.: 17/377,140

(22) Filed: Jul. 15, 2021

(65) Prior Publication Data

US 2023/0016194 A1 Jan. 19, 2023

(51) Int. Cl.
*H04W 28/02* (2009.01)
*H04W 28/06* (2009.01)
*H04W 72/1268* (2023.01)
*H04W 72/1273* (2023.01)

(52) U.S. Cl.
CPC ....... *H04W 28/0268* (2013.01); *H04W 28/06* (2013.01); *H04W 72/1268* (2013.01); *H04W 72/1273* (2013.01)

(58) Field of Classification Search
CPC ............. H04W 28/0268; H04W 28/06; H04W 72/1268; H04W 72/1273
See application file for complete search history.

(56) References Cited

U.S. PATENT DOCUMENTS

| 2007/0058669 | A1* | 3/2007 | Hoffmann | H04L 47/10 370/466 |
| 2008/0132268 | A1* | 6/2008 | Choi-Grogan | H04W 28/24 455/550.1 |
| 2018/0270695 | A1* | 9/2018 | Bergström | H04W 28/0268 |
| 2019/0159072 | A1* | 5/2019 | Zhu | H04W 28/0205 |
| 2020/0059817 | A1 | 2/2020 | Baek et al. | |
| 2020/0154304 | A1 | 5/2020 | Cho et al. | |
| 2021/0014722 | A1* | 1/2021 | Han | H04W 28/0268 |

(Continued)

OTHER PUBLICATIONS

International Search Report and Written Opinion—PCT/US2022/033643—ISA/EPO—Sep. 20, 2022.

*Primary Examiner* — Mandish K Randhawa
(74) *Attorney, Agent, or Firm* — Patterson & Sheridan, L.L.P.

(57) ABSTRACT

Aspects of the present disclosure provide example apparatus, methods, processing systems, and computer readable mediums implementing techniques for modifying a configuration of a radio bearer based on a request for quality of service (QoS) for a communication flow. In aspects, a user equipment (UE) receives a request for a QoS for a communication flow and maps the communication flow to a radio bearer based on a downlink map. The UE is configured to communicate over a number of radio bearers. The downlink map associates one or more communication flows to one or more of the number of radio bearers. The UE then modifies a configuration of the radio bearer based on the request for the QoS. During operation, the UE receives one or more downlink packets on the radio bearer and processes the one or more downlink packets according to the QoS.

24 Claims, 8 Drawing Sheets

(56) References Cited

U.S. PATENT DOCUMENTS

2021/0204160 A1    7/2021  Jo et al.
2022/0225465 A1*   7/2022  Xu ........................ H04W 24/02
2022/0377602 A1*  11/2022  Kim ...................... H04W 28/12

* cited by examiner

MODIFYING A CONFIGURATION OF A RADIO BEARER BASED ON A REQUEST FOR QUALITY OF SERVICE (QOS) FOR A COMMUNICATION FLOW

INTRODUCTION

Aspects of the present disclosure relate to wireless communications, and more particularly, to techniques for use in radio bearer configuration.

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims, which follow, some features will now be discussed briefly. After considering this discussion, and particularly after reading the section entitled "Detailed Description" one will understand how the features of this disclosure provide applications the ability to request quality of service (QoS) for communication flows (e.g., Internet protocol (IP) flows) regardless of the radio bearer the communication flow is communicated over.

Certain aspects of the subject matter described in this disclosure can be implemented in a method for wireless communication by a user equipment (UE). The method generally includes receiving, at the UE, a request for a quality of service for a communication flow, wherein the UE is configured to communicate over a plurality of radio bearers. The method further includes mapping, at the UE, the communication flow to a radio bearer based on a downlink map of one or more communication flows to one or more of the plurality of radio bearers. The method includes modifying a configuration of the radio bearer based on the request for the quality of service. The method further includes receiving, at the UE, one or more downlink packets on the radio bearer; and processing the one or more downlink packets according to the quality of service.

Certain aspects of the subject matter described in this disclosure can be implemented in a user equipment (UE) for wireless communications. The UE includes a memory; and a processor coupled to the memory. The processor and the memory are configured to receive a request for a quality of service for a communication flow. The UE is configured to communicate over a plurality of radio bearers. The processor and the memory are further configured to map the communication flow to one of the plurality of radio bearers based on a downlink map of one or more communication flows to one or more of the plurality of radio bearers. The processor and the memory are configured to modify a configuration of the one of the plurality of radio bearers based on the request for the quality of service. The processor and the memory are configured to receive one or more downlink packets on the one of the plurality of radio bearers. The processor and the memory are further configured to process the one or more downlink packets according to the quality of service.

Certain aspects of the subject matter described in this disclosure can be implemented in a user equipment (UE) for wireless communications. The UE includes means for receiving a request for a quality of service for a communication flow. The UE is configured to communicate over a plurality of radio bearers. The UE further includes means for mapping the communication flow to one of the plurality of radio bearers based on a downlink map of one or more communication flows to one or more of the plurality of radio bearers. The UE includes means for modifying a configuration of the one of the plurality of radio bearers based on the request for the quality of service. The UE includes means for receiving one or more downlink packets on the one of the plurality of radio bearers. The UE includes means for processing the one or more downlink packets according to the quality of service.

Certain aspects of the subject matter described in this disclosure can be implemented in a non-transitory computer readable medium storing instructions that when executed by a user equipment (UE) cause the UE to receive, at the UE, a request for a quality of service for a communication flow. The UE is configured to communicate over a plurality of radio bearers. The instructions when executed by the UE further causes the UE to map, at the UE, the communication flow to one of the plurality of radio bearers based on a downlink map of one or more communication flows to one or more of the plurality of radio bearers. The instructions when executed by the UE further causes the UE to modify a configuration of the one of the plurality of radio bearers based on the request for the quality of service. The instructions when executed by the UE further causes the UE to receive, at the UE, one or more downlink packets on the one of the plurality of radio bearers. The instructions when executed by the UE further causes the UE to process the one or more downlink packets according to the quality of service.

Aspects of the present disclosure provide means for, apparatus, processors, and computer-readable mediums for performing the methods described herein.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects and examples are described in this application by illustration to some examples, those skilled in the art will understand that additional implementations and use cases may come about in many different arrangements and scenarios. Aspects described herein may be implemented across many differing platform types, devices, systems, shapes, sizes, packaging arrangements. For example, aspects and/or uses may come about via integrated chip aspects and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of the described aspects may occur. Implementations may range in spectrum from chip-level or modular components to non-modular, non-chip-level implementations and further to aggregate, distributed, or OEM devices or systems incorporating one or more aspects. In some practical settings, devices incorporating described aspects and features may also necessarily include additional components and features for implementation and practice of claimed and described aspects. For example, transmission and reception of wireless signals may include a number of components for analog and digital purposes (e.g., hardware components including antenna, RF-chains, power amplifiers, modulators, buffer, processor(s), interleaver, adders/summers, etc.). It is intended that the aspects described herein may be practiced in a wide variety of devices, chip-level components, systems, distributed arrangements, end-user devices, etc. of varying sizes, shapes, and constitution.

To the accomplishment of the foregoing and related ends, one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
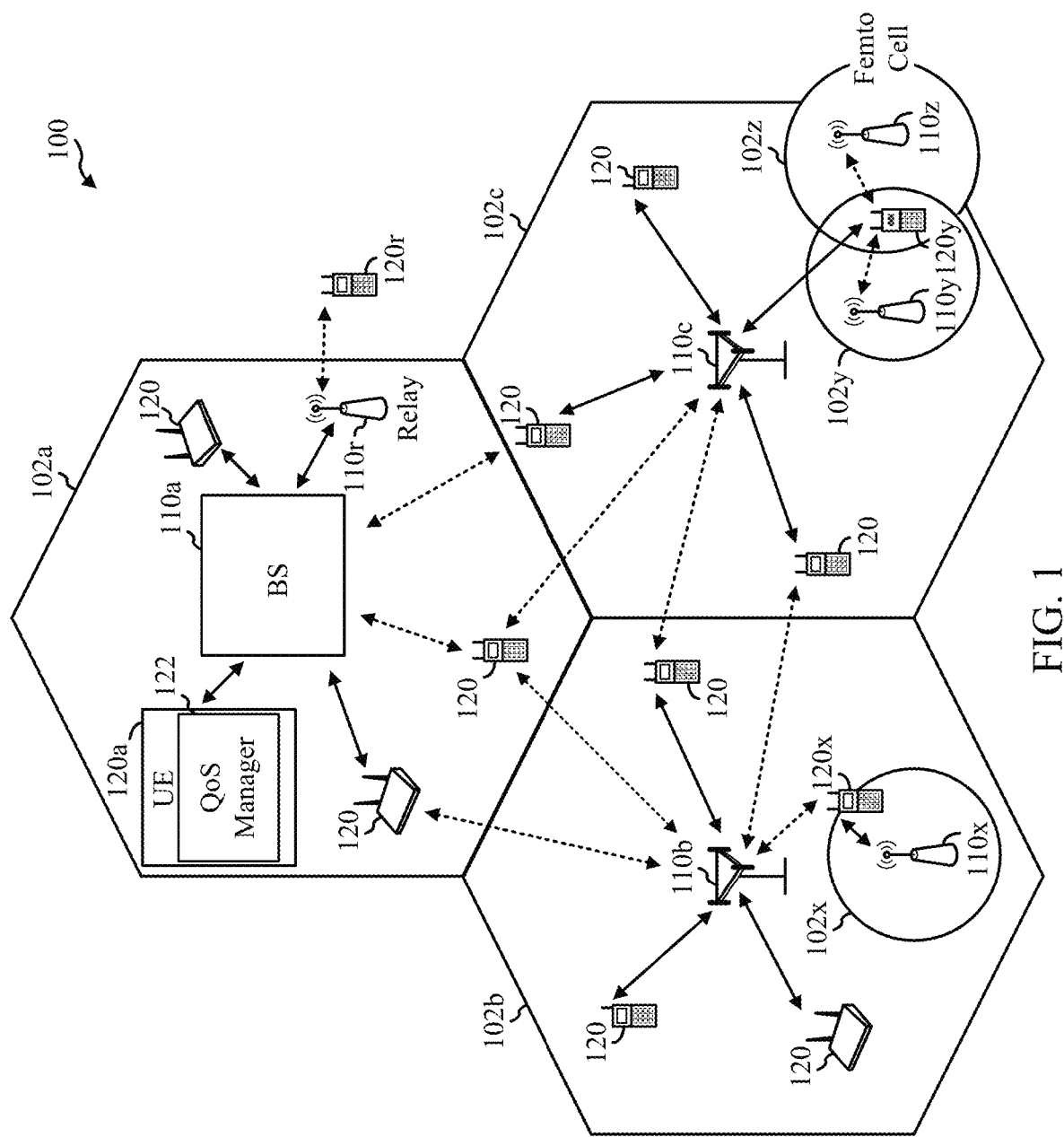
FIG. 1 is a block diagram conceptually illustrating an example wireless communication network, in accordance with certain aspects of the present disclosure.
Figure 1:
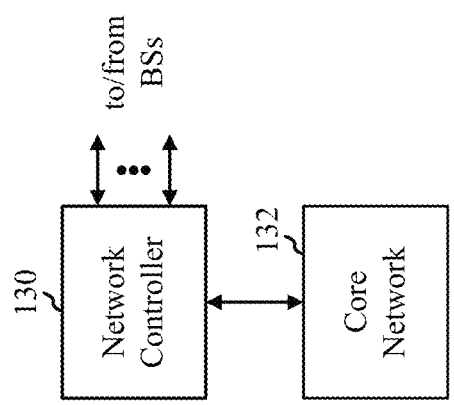

Aspects of the present disclosure provide example apparatus, methods, processing systems, and computer readable mediums implementing techniques for use in radio bearer configuration. For example, techniques are provided herein for modifying a configuration of a radio bearer based on a request for quality of service (QoS) for a communication flow, such as an Internet protocol (IP) flow. Though certain aspects may be described with respect to an IP flow as an example, it should be noted that the techniques discussed herein may be similarly applicable to other types of communication flows.

In certain aspects, a wireless communication device, such as a user equipment (UE) that includes a modem. The UE may use the modem as an interface to communicate over a wireless communication network. The modem may handle configuration of radio bearers and communication over the radio bearers with a base station (BS) of the communication network. The UE includes memory and one or more processors that execute one or more applications running on the UE. An application may request that data thereof are communicated with certain QoS. For example, the application may make an application programming interface (API) call to the modem of the UE to request that the data be communicated using a particular QoS. For example, the computing device may be coupled to the UE by a suitable wired (e.g., USB) and/or wireless (e.g., Bluetooth, WiFi, etc.) interface. Though certain aspects are described with respect to an application running on the UE, it should be noted that the techniques discussed herein may be similarly applicable to applications running on a computing device coupled to the UE. An "application associated with the UE" may refer to an application directly running on a processor of the UE, or running on a computing device coupled to the UE.

An application associated with the UE, may use the Internet Protocol (IP) as the transport layer for communicating (e.g., exchanging any information, such as messages, data, or traffic) with other devices (e.g., BS, server, UE, computing device, etc.). Data exchanged between the UE and another device may be exchanged as data packets and be referred to as a communication flow. According to one or more aspects, a communication flow is identified as data packets having the same header values (e.g., 5-tuple including: source IP address, destination IP address, source port, destination port, and protocol, or other possible header values having any suitable number of parameters).

A radio access network (RAN) may use radio bearers between the UE and one or more base stations (BSs) to exchange data, and accordingly, to transport said communication flows. A radio bearer is associated with a bearer service linking two points (e.g., the UE and a BS). The radio bearer specifies the configuration for one or more layers (such as layer 2 and/or physical layer) to define quality of service. In certain aspects, a particular radio bearer between a UE and a BS may be a default radio bearer used for communication by default, unless another radio bearer is specifically requested (e.g., by the UE or the BS) or configured for use. In one or more aspects, such radio bearers used for exchange of data traffic of applications running on the UE as discussed herein may be separate and different from radio bearers used for IP multimedia subsystem (IMS) calls, and different processes may apply. For example, processes applicable to IMS calls may not be applicable to the applications discussed herein In certain aspects, it may be desirable to allow an application associated with a UE to request a particular QoS for a particular communication flow. In certain aspects, the particular QoS may be local or proprietary to the UE, such that the UE may request the particular QoS by itself. In certain aspects, a QoS may specify specific traffic prioritization or resource reservation control, such that different services, users, or data flows may have different priorities. Accordingly, the application is enabled to have data exchanged with a particular QoS. The application itself, in some cases, may not have information regarding the radio bearer over which the particular communication flow is communicated, and therefore cannot request QoS for the radio bearer directly. Thus, in certain aspects, the UE may map a communication flow to a radio bearer being used to transport the communication flow, and may configure (e.g., locally) the radio bearer based on the request for the QoS. Accordingly, data communicated over the radio bearer, including the communication flow, is communicated according to the requested QoS.

In certain aspects, the UE maintains a mapping of communication flows to radio bearers in order to map a given communication flow to a given radio bearer. The mapping may be maintained in one or more maps. For example, in certain aspects, a BS or other network entity configures the UE with an uplink map that maps communication flows to uplink radio bearers used for uplink communication from the UE to the BS.

In certain aspects, the UE may not be configured by a BS or other network entity with a map that maps communication flows to radio bearers. For example, the UE may not be configured by the BS or the network entity with a downlink map that maps communication flows to downlink radio bearers used for downlink communication from the BS to the UE. Without such a mapping of communication flows to radio bearers, if an application associated with the UE were to request QoS for a communication flow to be transmitted from the BS to the UE, such as on the downlink, the UE may not be able to identify which bearer is used to transmit the communication flow.

Thus, in certain aspects, an application associated with a UE can request QoS for a communication flow communicated on a downlink on a radio bearer (e.g., other than a default downlink radio bearer of the UE) for downlink communication of the UE. In certain aspects, the UE maps the communication flow to the radio bearer based on a downlink map maintained at the UE, the downlink map storing a mapping of communication flows communicated on the downlink to downlink radio bearers. In certain aspects, the UE modifies a configuration of the radio bearer based on the request for the QoS. In certain aspects, the UE similarly maintains an uplink map and similarly maps a communication flow communicated on an uplink on an uplink radio bearer to the uplink radio bearer. During operation, the UE may receive or send one or more downlink or uplink packets on the radio bearer and processes the one or more downlink or uplink packets according to the QoS.

In certain aspects, the UE may itself derive the downlink map based on downlink traffic received at the UE, thereby allowing the UE to support the application to request QoS for a communication flow. For example, the UE derives a mapping relationship between the communication flow and the radio bearer when the UE is not configured with the downlink map by the BS or a network entity. For example, in certain aspects, while processing the downlink traffic, the UE may map the bearer ID on which the traffic is received to a 5-tuple of the communication flow indicated in the headers of the packet.

The techniques herein may increase throughput and reduce latency for traffic, such as by allowing application to request QoS for traffic that may require high throughput and/or low latency.

The following description provides examples of techniques for modifying a configuration of a radio bearer based on a request for QoS for a communication flow. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein.

In addition, the scope of the disclosure is intended to cover such an apparatus or method, which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs.

The techniques described herein may be used for various wireless networks and radio technologies. While aspects may be described herein using terminology commonly associated with 3G, 4G, and/or new radio (e.g., 5G NR) wireless technologies, aspects of the present disclosure can be applied in other generation-based communication systems.

NR access may support various wireless communication services, such as enhanced mobile broadband (eMBB) targeting wide bandwidth, millimeter wave (mmW), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

NR supports beamforming and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

FIG. 1 illustrates an example wireless communication network 100 in which aspects of the present disclosure may be performed. For example, the wireless communication network 100 may include a user equipment (UE) 120 configured to perform operations 500 of FIG. 5 to process downlink packets according to a quality of service (QoS). The wireless network 100 may include a base station 110 configured to perform complementary operations in concert with the operations 500 performed by the UE 120.

As shown in FIG. 1, the wireless communication network 100 may be in communication with a core network 132. The core network 132 may be in communication with one or more base stations (BSs 110) 110a-z (each also individually referred to herein as BS 110 or collectively as BSs 110) and/or user equipment (UE 120) 120a-y (each also individually referred to herein as UE 120 or collectively as UEs 120) in the wireless communication network 100 via one or more interfaces.

A BS 110 may provide communication coverage for a particular geographic area, sometimes referred to as a "cell," which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. ABS may support one or multiple cells.

The BSs 110 communicate with UEs 120 in the wireless communication network 100. The UEs 120 (e.g., 120x, 120y, etc.) may be dispersed throughout the wireless communication network 100, and each UE 120 may be stationary or mobile. Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A network controller 130 may be in communication with a set of BSs 110 and provide coordination and control for these BSs 110 (e.g., via a backhaul). In aspects, the network controller 130 may be in communication with a core network 132 (e.g., a 5G Core Network (5GC)), which provides various network functions such as Access and Mobility Management, Session Management, User Plane Function, Policy Control Function, Authentication Server Function, Unified Data Management, Application Function, Network Exposure Function, Network Repository Function, Network Slice Selection Function, etc.

According to certain aspects, the UEs 120 may be configured for QoS management. As shown in FIG. 1, the UE 120a includes a QoS manager 122. The QoS manager 122 may be configured to perform operations for providing QoS on a radio bearer associated with a communication flow for which an application running on the UE 120a requests QoS, according to aspects described herein.

Figure 2:
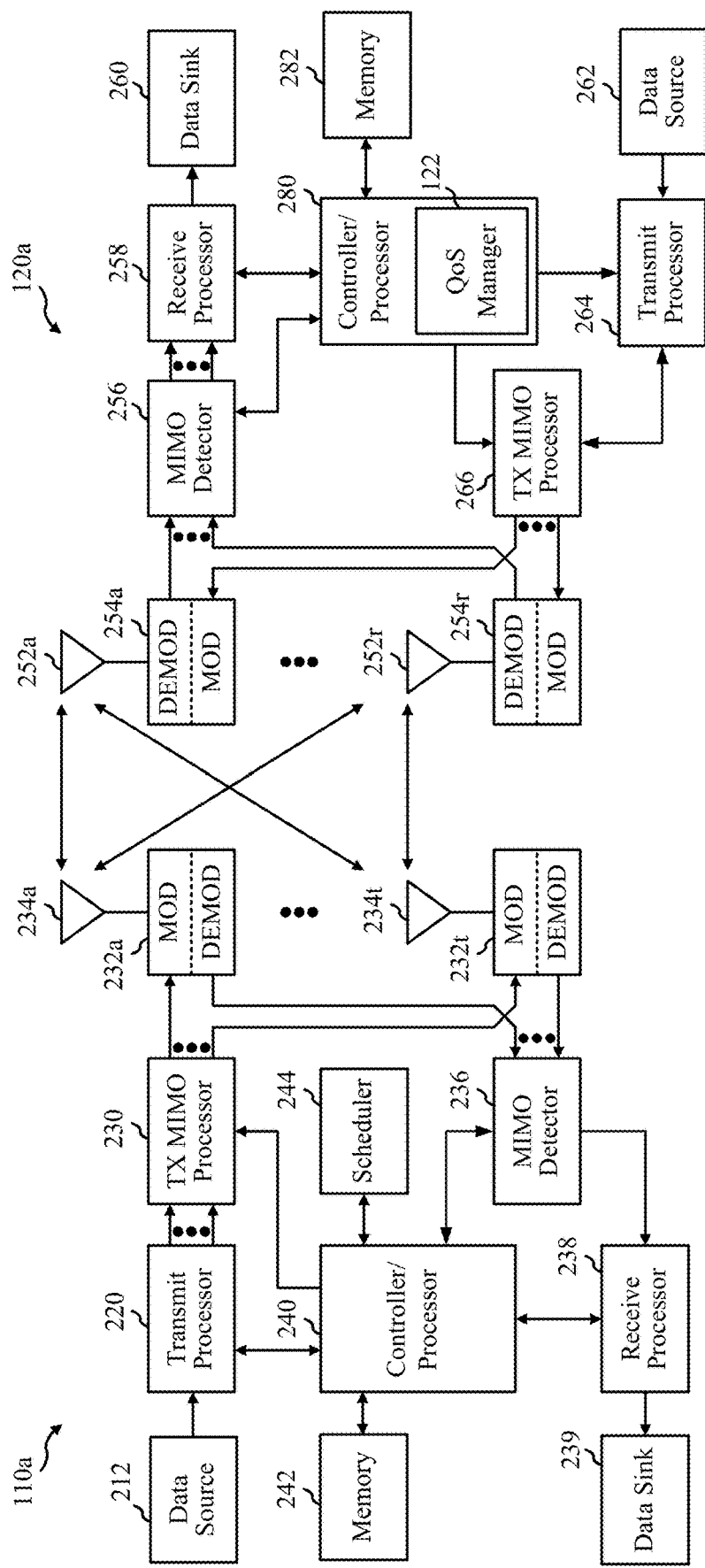
FIG. 2 is a block diagram conceptually illustrating a design of an example base station (BS) and user equipment (UE), in accordance with certain aspects of the present disclosure.

FIG. 2 illustrates example components of BS 110a and UE 120a (e.g., the wireless communication network 100 of FIG. 1), which may be used to implement aspects of the present disclosure.

At the BS 110a, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), PBCH demodulation reference signal (DMRS), and channel state information reference signal (CSI-RS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a-232t. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 232a-232t may be transmitted via the antennas 234a-234t, respectively.

At the UE 120a, the antennas 252a-252r may receive the downlink signals from the BS 110a and may provide received signals to the demodulators (DEMODs) in transceivers 254a-254r, respectively. Each demodulator 254 may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink, at UE 120a, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM, etc.), and transmitted to the BS 110a. At the BS 110a, the uplink signals from the UE 120a may be received by the antennas 234, processed by the modulators 232, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

The memories 242 and 282 may store data and program codes for BS 110a and UE 120a, respectively. A scheduler 244 may schedule UEs for data transmission on the downlink and/or uplink.

Antennas 252, processors 266, 258, 264, and/or controller/processor 280 of the UE 120a and/or antennas 234, processors 220, 230, 238, and/or controller/processor 240 of the BS 110a may be used to perform the various techniques and methods described herein. For example, as shown in FIG. 2, the controller/processor 280 of the UE 120a has the QoS manager 122. Although shown at the controller/processor, other components of the UE 120a and BS 110a may be used to perform the operations described herein.

NR may utilize orthogonal frequency division multiplexing (OFDM) with a cyclic prefix (CP) on the uplink and downlink. NR may support half-duplex operation using time division duplexing (TDD). OFDM and single-carrier frequency division multiplexing (SC-FDM) partition the system bandwidth into multiple orthogonal subcarriers, which are also commonly referred to as tones, bins, etc. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, etc.).

Figure 3:
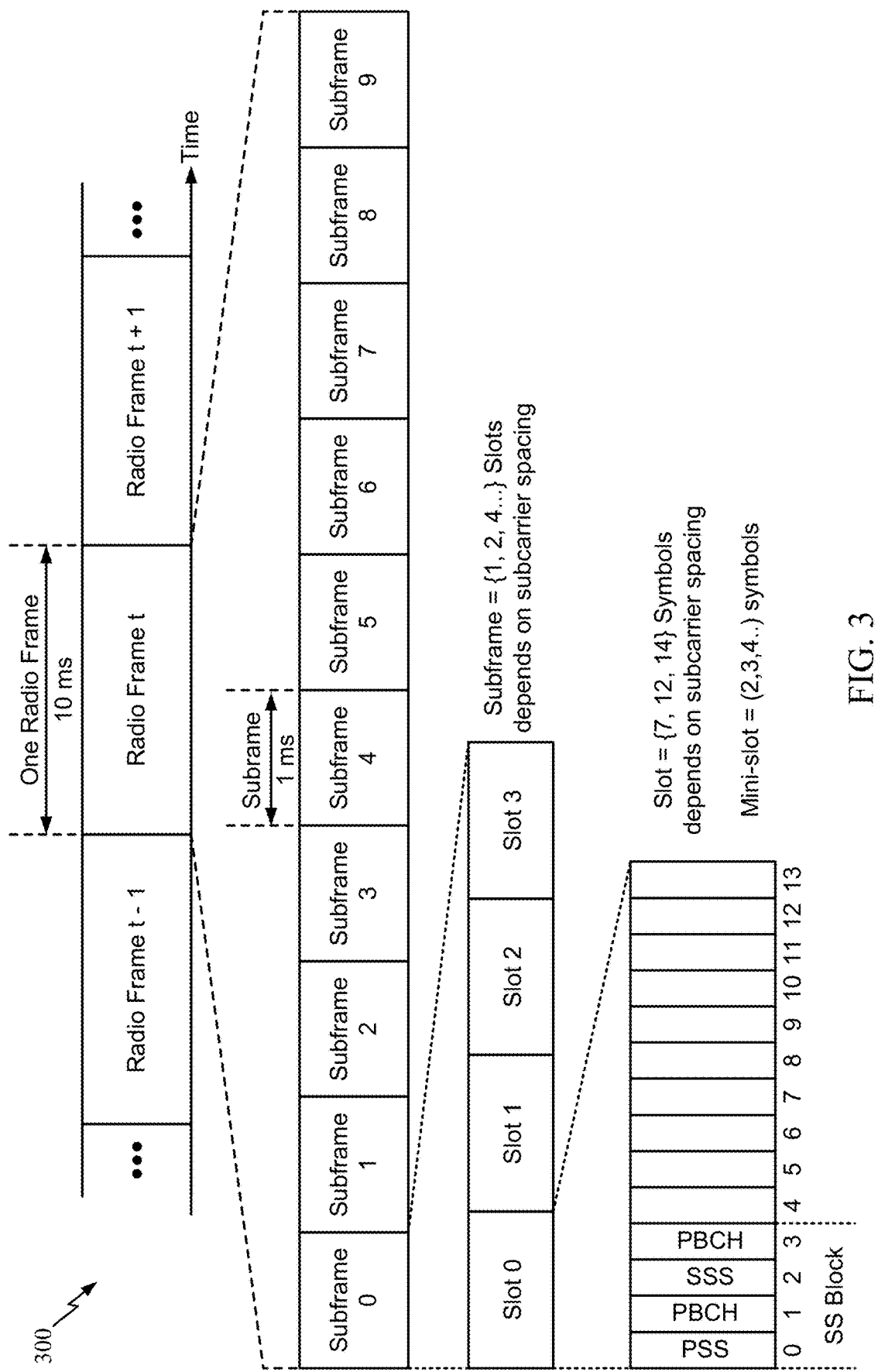
FIG. 3 is an example frame format for certain wireless communication systems (e.g., new radio (NR)), in accordance with certain aspects of the present disclosure.

FIG. 3 is a diagram showing an example of a frame format 300 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots (e.g., 1, 2, 4, 8, 16, . . . slots) depending on the SCS. Each slot may include a variable number of symbol periods (e.g., 7, 12, or 14 symbols) depending on the SCS. The symbol periods in each slot may be assigned indices. A mini-slot, which may be referred to as a sub-slot structure, refers to a transmit time interval having a duration less than a slot (e.g., 2, 3, or 4 symbols). Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal block (SSB) is transmitted. In certain aspects, SSBs may be transmitted in a burst where each SSB in the burst corresponds to a different beam direction for UE-side beam management (e.g., including beam selection and/or beam refinement). The SSB includes a PSS, a SSS, and a two symbol PBCH. The SSB can be transmitted in a fixed slot location, such as the symbols 0-3 as shown in FIG. 3. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SSBs may be organized into SS bursts to support beam sweeping. Further system information such as, remaining minimum system information (RMSI), system information blocks (SIBs), other system information (OSI) can be transmitted on a physical downlink shared channel (PDSCH) in certain subframes. The SSB can be transmitted up to sixty-four times, for example, with up to sixty-four different beam directions for mmWave. The multiple transmissions of the SSB are referred to as a SS burst set. SSBs in an SS burst set may be transmitted in the same frequency region, while SSBs in different SS bursts sets can be transmitted at different frequency regions.

Figure 4C:
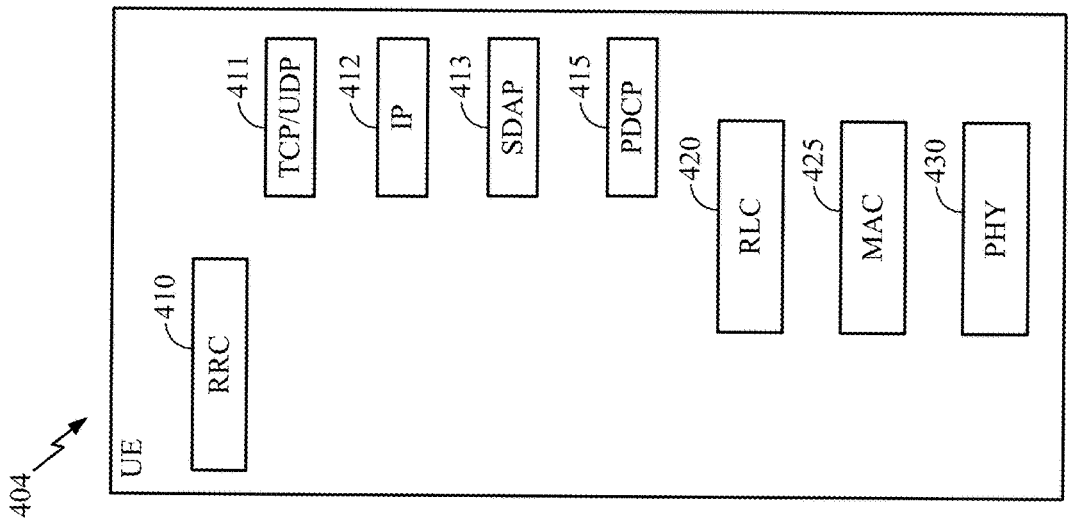
FIGS. 4A-4C are diagrams showing examples for implementing communication protocol stacks, in accordance with certain aspects of the present disclosure.
Figure 4B:
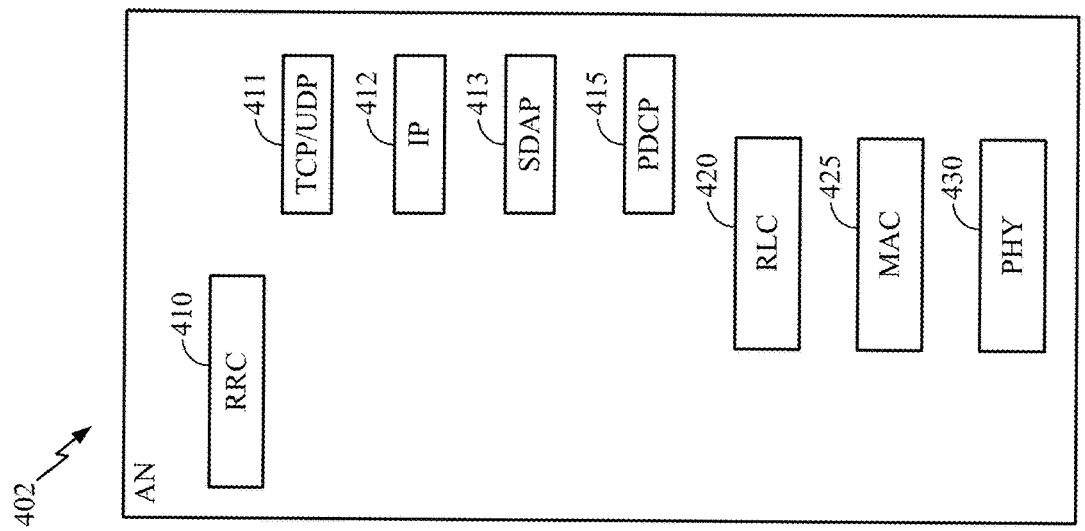
Figure 4A:
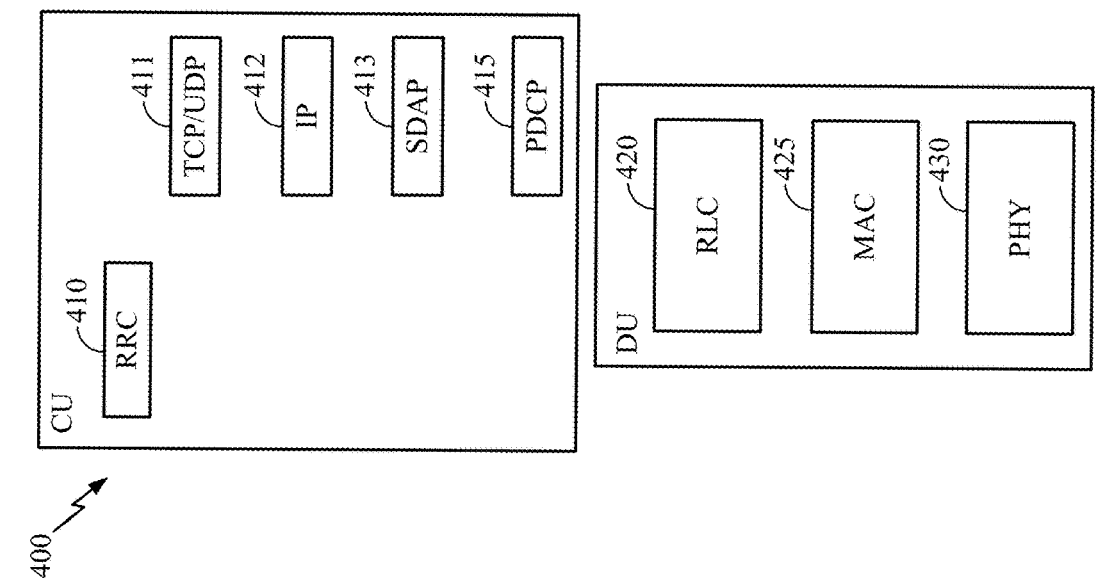

FIGS. 4A-4C illustrate diagrams 400, 402, and 404, respectively, showing examples for implementing communications protocol stacks, according to aspects of the present disclosure. The illustrated communications protocol stacks may be implemented by devices operating in a wireless communication system, such as a 4G system (e.g., a system that supports uplink-based mobility).

In FIG. 4A, the diagram 400 illustrates a communications protocol stack for a central unit (CU) including a Radio Resource Control (RRC) layer 410, a Transmission Control Protocol (TCP) or User Datagram Protocol (UDP) layer 411, an Internet Protocol (IP) layer 412, a Service Data Adaptation Protocol (SDAP) layer 413, and a Packet Data Convergence Protocol (PDCP) layer 415. The diagram further illustrates a distributed unit (DU) including a Radio Link Control (RLC) layer 420, a Medium Access Control (MAC) layer 424, and a Physical (PHY) layer 430. The upper layer stacks may handle the traffic of the radio bearer when parameters can be modified for QoS requirements. In various examples, the layers of a protocol stack may be implemented as separate modules of software, portions of a processor or ASIC, portions of non-collocated devices connected by a communications link, or various combinations thereof.

FIG. 4A shows a split implementation of a protocol stack, in which implementation of the protocol stack is split between a centralized network access device, such as a CU, and distributed network access device, such as a DU. An RRC layer 410, TCP or UDP layer 411, an IP layer 412, a SDAP layer 413, and a PDCP layer 415 may be implemented by the CU. An RLC layer 420, a MAC layer 424, and a PHY layer 430 may be implemented by the DU. In various examples the CU and the DU may be collocated or non-collocated. The diagram 400 shown in FIG. 4A may be useful in a macro cell, micro cell, or pico cell deployment.

Collocated and non-collocated implementations may be used. In FIG. 4B, the diagram 402 illustrates a communication protocol stack, in which the protocol stack is implemented in a single network access device. As shown, the RRC layer 410, TCP/UDP layer 411, IP layer 412, SDAP layer 413, PDCP layer 415, RLC layer 420, MAC layer 424, and PHY layer 430 may each be implemented by the access node (AN). The option shown in FIG. 4B may be useful in, for example, a femto cell deployment.

In FIG. 4C, the diagram 404 illustrates a communication protocol stack for a UE including also an RRC layer 410, a TCP/UDP layer 411, an IP layer 412, an SDAP layer 413, a PDCP layer 415, an RLC layer 420, a MAC layer 425, and a PHY layer 430. Regardless of whether a network access device implements part or all of a protocol stack, the UE may implement an entire protocol stack as shown in FIG. 4C.

In certain aspects, deriving the downlink map based on downlink traffic received at the UE, is performed at the PDCP layer 415 or across two or more layers of the UE 120a. For example, the UE 120a may review the IP packet included in the PDCP packet. The IP packet header includes the 5-tuple (of the IP flow) and the PDCP layer 415 includes the bearer ID. For example, while processing the downlink traffic, an IP filter installed at the PDCP layer 415 maps the bearer ID on which the traffic is received to 5-tuple of the IP flow indicated in the headers of the packet.

Aspects discussed herein may include a variety of spacing and timing deployments. For example, in LTE, the basic transmission time interval (TTI) or packet duration is the 1 ms subframe. In NR, a subframe is still 1 ms, but the basic TTI is referred to as a slot. A subframe contains a variable number of slots (e.g., 1, 2, 4, 8, 16, slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing.

Figure 5:
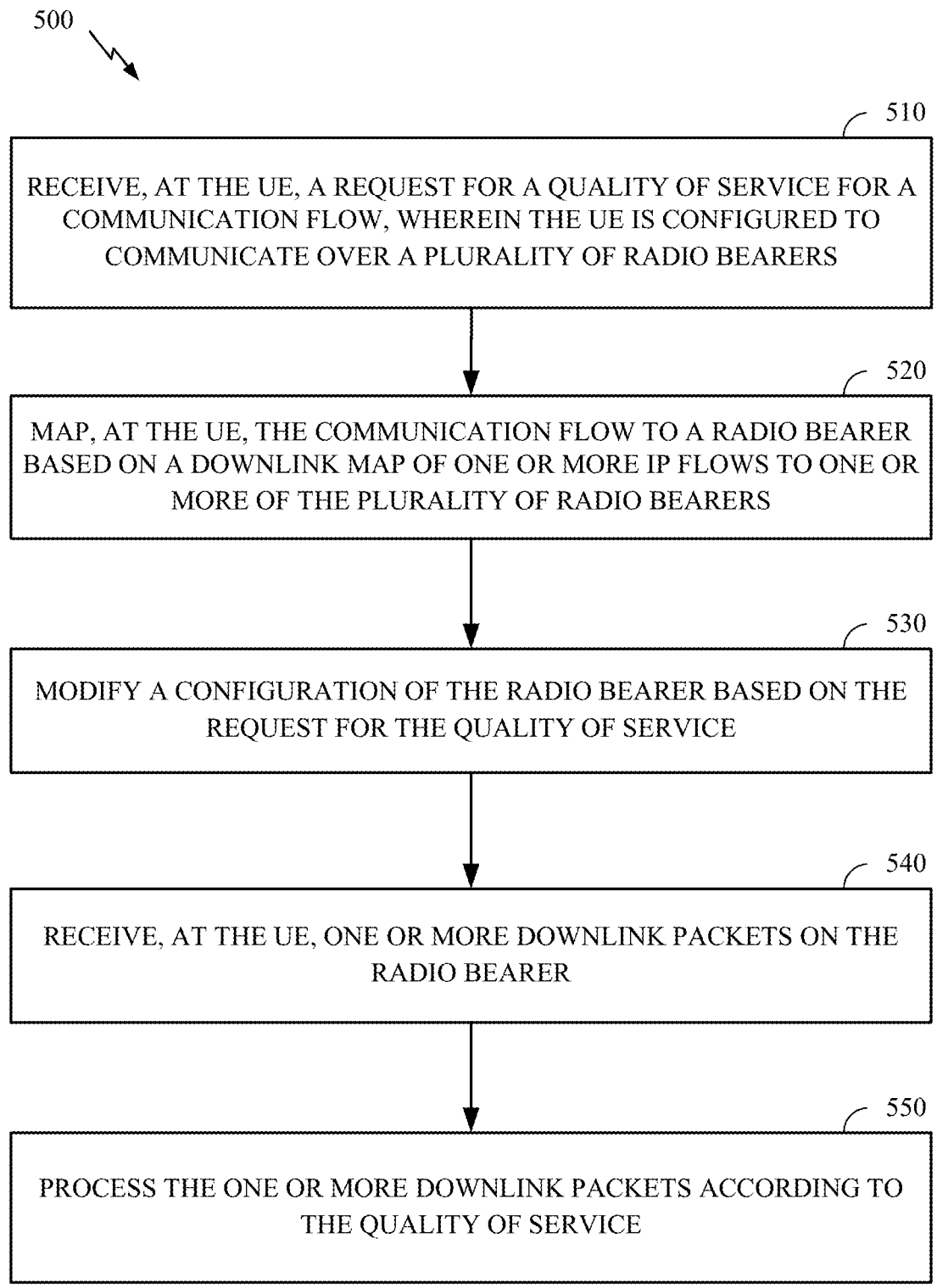
FIG. 5 is flow diagram illustrating example operations for wireless communication by a UE, in accordance with certain aspects of the present disclosure.

Example Techniques for Modifying Radio Bearer Configuration Based on Request for Quality of Service Aspects of the present disclosure provide techniques and apparatus for modifying a configuration of a radio bearer based on a request for quality of service (QoS) for a communication flow, such as an Internet protocol (IP) flow. FIG. 5 is a flow diagram illustrating example operations 500 for wireless communication, in accordance with certain aspects of the present disclosure. The operations 500 may be performed, for example, by a UE (e.g., the UE 120 in the wireless communication network 100).

The operations 500 may be implemented as software components that are executed and run on one or more processors (e.g., controller/processor 280 of FIG. 2). Further, the transmission and reception of signals by the UE in operations 500 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 500 may begin, at 510, by receiving, at the UE, a request for a QoS for a communication flow. The UE may be configured to communicate over one or a number of radio bearers. In certain aspects, the request for the QoS may include an indication of a latency requirement for the radio bearer or the communication flow.

In certain aspects, the request for the QoS may include an indication of an activation status of out-of-order delivery of packets of the radio bearer or the communication flow. In certain aspects, the request for the QoS may include an indication of a configuration for fast radio link control (RLC) polling for the radio bearer or the communication flow. In certain aspects, the request for the QoS may include an indication of a configuration for fast RLC status reporting for the radio bearer or the communication flow. In certain aspects, the request for the QoS may include an indication of a configuration for fast RLC retransmission for the radio bearer or the communication flow. In certain aspects, the request for the QoS may include an indication of a configuration for a Packet Data Convergence Protocol (PDCP) reordering timer for the radio bearer or the communication flow. In certain aspects, the request for the QoS may include an indication of a configuration for an operation of data movement between the UE and a computing device running the application. The above configuration indications may be included in the requests, or in some cases, the indications may be implied by the QoS being requested. The UE (e.g., UE modem) may select the indications internally (e.g., when the UE interface may not offer explicit control over the configuration indications).

Figure 7:
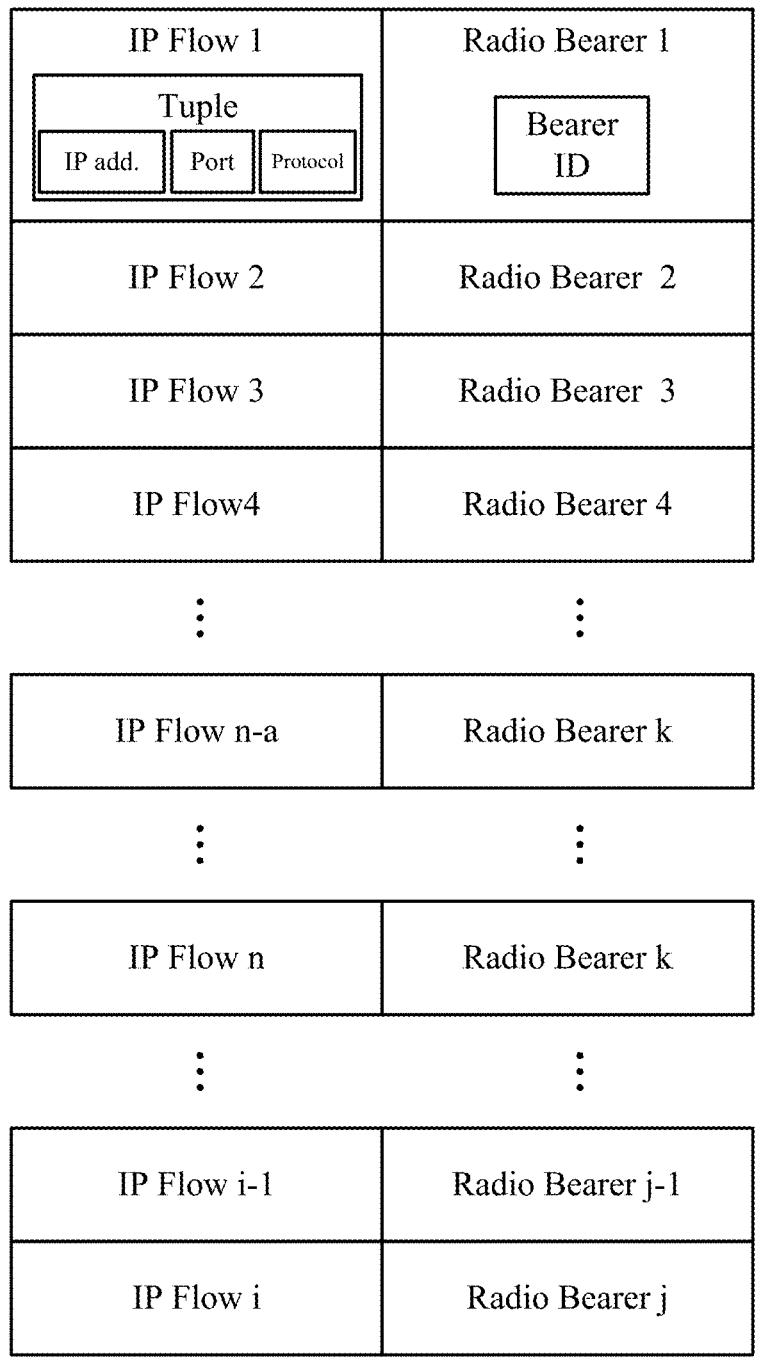
FIG. 7 is an example downlink map, in accordance with certain aspects of the present disclosure.

At 520, the UE maps the communication flow to a radio bearer based on a downlink map of one or more communication flows to one or more of the number of radio bearers. In certain aspects, the downlink map may be derived at the UE based on downlink traffic received at the UE. An example of the downlink map is shown in FIG. 7 and discussed in detail below. Though an example is shown in FIG. 7 of a downlink map as a table, the downlink map may be any suitable data structure associating radio bearers with communication flows, such as one or more of a table, a mapping, a hash, etc.

At 530, the UE modifies a configuration of the radio bearer based on the request for the quality of service. For example, modifying the configuration may include locally modifying the configuration of the radio bearer. This local modification may differentiate from receiving a request from another UE. Modifying the configuration may include modifying the activation status of out-of-order delivery of packets of the radio bearer or the communication flow. In certain aspects, modifying the configuration may include modifying the configuration for fast RLC polling for the radio bearer or the communication flow. In certain aspects, modifying the configuration may include modifying the configuration for fast RLC status reporting for the radio bearer or the communication flow. In certain aspects, modifying the configuration may include modifying the configuration for fast RLC retransmission for the radio bearer or the communication flow. In certain aspects, modifying the configuration may include modifying the configuration for the PDCP reordering timer, RLC reassembly timer, RLC status prohibit timer for the radio bearer or the communication flow. In certain aspects, modifying the configuration may include modifying the configuration of the data movement, for this flow or bearer, between the computing device running the application and the UE. A QoS bearer with appropriate parameters may be selected for the transfer between the computing device and the UE.

At 540, the UE may receive one or more downlink packets on the radio bearer. For example, the radio bearer is used for downlink traffic of the communication flow. In certain aspects, a second radio bearer may be used for uplink traffic of the communication flow. The second radio bearer may be associated with a second QoS. At 550, the UE processes the one or more downlink packets according to the quality of service.

According to certain aspects, at least one of the one or more downlink packets is of the communication flow. In certain aspects, the UE may derive the downlink map based on downlink traffic received at the UE. For example, the UE may derive a bearer ID for the radio bearer as mapped to a tuple (e.g., 5-tuple) of the communication flow at a data layer (e.g., PDCP layer) of the UE (e.g. UE modem). The UE may further receive from a network an uplink map that maps communication flows to radio bearers. The downlink map is used for downlink traffic, and the uplink map is used for uplink traffic.

In some cases, the UE may update the downlink map to map the communication flow to a second radio bearer based on downlink traffic received at the UE. For example, the UE may update the downlink map based on checking (e.g., periodically, such as every few seconds) downlink traffic received for communication flows to see if the radio bearer on which the packets of the communication flow are received have changed. If so, the UE may update the downlink map to reflect that the communication flow is now mapped to a different radio bearer. In particular, the radio bearer on which a communication flow is communicated may change, and there may not be other procedures for determining the change.

In some cases, a client device may request for an application ID from the UE, which then provides one application ID. The UE may then apply QoS treatment to all the communication traffic associated (e.g., to and from) with the application ID, such as included in the 5-tuples.

Figure 6:
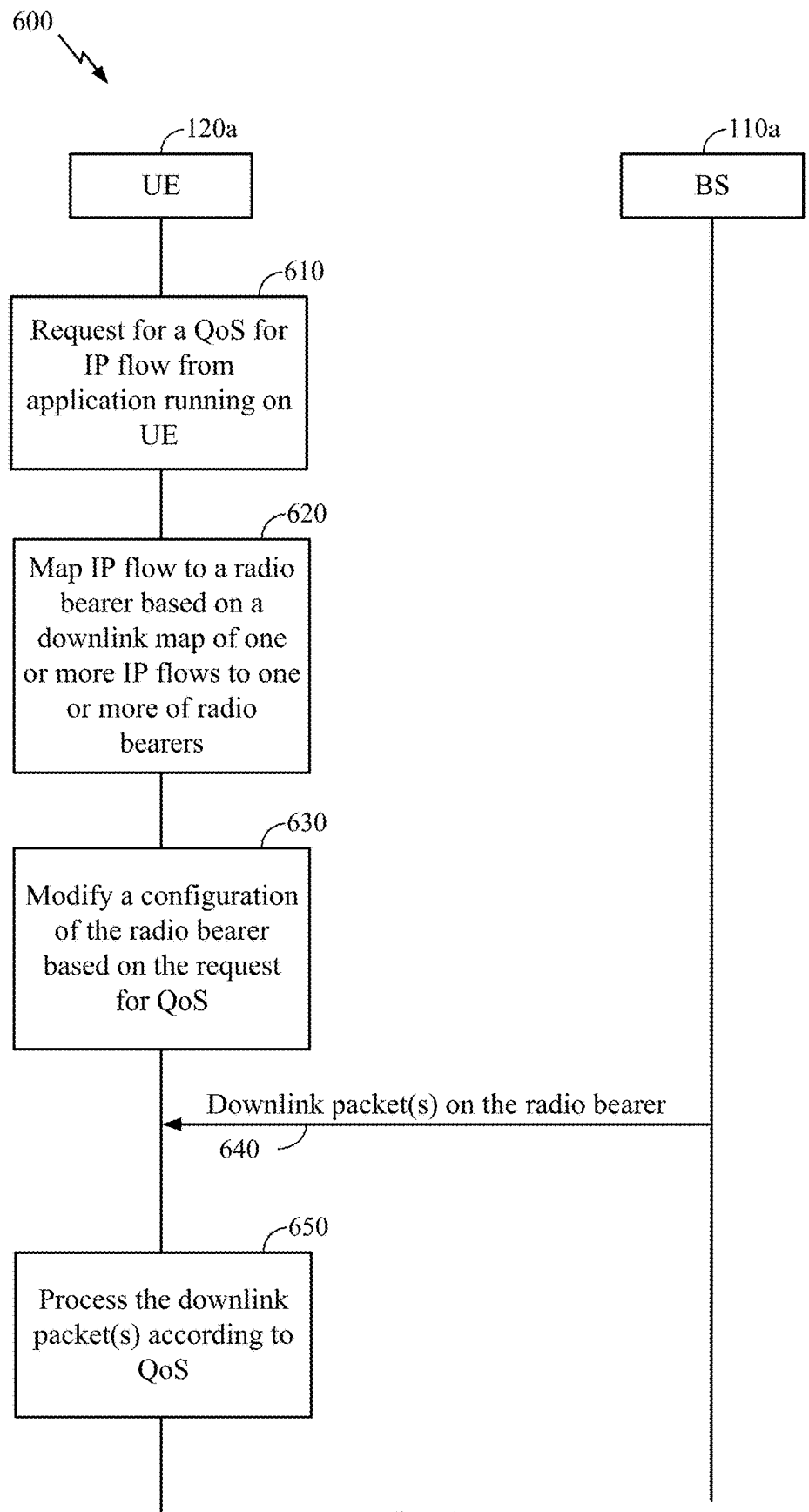
FIG. 6 is a call flow diagram illustrating example signaling for modifying a configuration of a radio bearer based on a request for quality of service (QoS) for a communication flow, in accordance with aspects of the present disclosure.

Operations 500 may be understood in view of FIG. 6, which is a call flow diagram 600 illustrating example signaling between the BS 110a and the UE 120a. As shown, at 610, an application associated with the UE 120a requests a QoS for a communication flow, such as via an application programming interface (API) provided for the modem of the UE 120a. The UE 120a maps the communication flow to a radio bearer based on a downlink map at 620. The downlink map may associate one or more communication flows to one or more radio bearers. The UE modifies a configuration of the radio bearer based on the request for QoS at 630. At 640, the BS 110a transmits one or more downlink packets on the radio bearer to the UE 120a. The UE 120a then processes the downlink packets according to the QoS at 650.

In some cases, the UE 120a transmits uplink transmissions to the BS 110a. As an illustrative example, two radio bearers may first be set up for an Internet PDU session between the BS 110a and the UE 120a. For example, the PDU session may provide end-to-end user plane connectivity between the UE 120a and a specific Data Network (DN) through the User Plane Function (UPF). A PDU Session supports one or more QoS Flows. A one-to-one mapping between QoS Flow and QoS profile may be established. As such, the transmitted packets belonging to a specific QoS Flow may have a common QoS identifier.

For example, on the uplink, the first of the two radio bearers may solely be used for communication flows having parameters corresponding to tuple A. The second of the two radio bearers may be used as a default radio bearer. On the downlink, the first of the two radio bearers may be used as a default radio bearer. The second of the two radio bearers may solely be used for communication flows having parameters corresponding to tuple A. For example, an application indicates the tuple A for uplink or downlink via an application programming interface (API).

During operation, if a low latency request is invoked for communication flows having parameters corresponding to tuple A, the UE uses modified parameters for the handling of the second radio bearer on the downlink. In some cases, the modified parameters may include an RLC reassembly timer or other parameters as described herein. Similarly, the UE may use modified parameters for the handling of the first radio bearer on the uplink. The modified parameters may include an RLC polling frequency or other parameters as described herein.

FIG. 7 is an example downlink map 700, in accordance with certain aspects of the present disclosure. As shown, one or more communication flows 1 through i on the left column may be mapped to (or associated with) the one or more radio bearers 1 through j on the right column in view of being in the same row. As shown, the mapping or association relationship needs not be one-to-one, that is, two or more communication flows (IP Flows n-a, and n) may be associated with a common radio bearer (Radio Bearer k). In particular, in certain aspects, the mapping indicates that a particular communication flow is communicated on the associated radio bearer.

In certain aspects, communication flows are identified in the downlink map 700 by a tuple as discussed. In certain aspects, the radio bearers may be identified in the downlink map 700 by a bearer ID so that each IP flow may be mapped to a radio bearer. In some cases, as shown in the communication flows n-a and n, two or more communication flows may be mapped to the same radio bearer k. In FIG. 7, i, j, k, n, and a are integers, wherein a<n<i, and k≤j.

In certain aspects, other mappings are possible, such as mapping or associating Ethernet headers to radio bearers (e.g., for an Ethernet PDU session). In certain aspects, the application associated with the UE could request QoS treatment according to some information found in the Ethernet header, for instance source address or destination address.

In some cases, the downlink map 700 may be derived based on an IP filter installed at a downlink modem data layer. In certain aspects, the IP filter, such as for communication flows for which QoS is requested, is configured to try to match the tuple of downlink traffic received at the filter to those for which QoS is requested. When traffic matches the tuple, the IP filter may trace back to identify the associated radio bearer. For example, because bearer ID may be needed for deciphering, in certain aspects the data layer provides an association between the bearer ID and the tuple of the communication flow. Upon tracing back the association between the radio bearer and the associated tuple, in certain aspects the UE may inform a mapping module running on the UE of the mapping between the radio bearer ID and the tuple of the communication flow, which then generates/updated downlink map 700. In certain aspects, the UE may continue to monitor, by tracing back, to determine whether the mapping between the radio bearer and the communication flow has changed. In certain aspects, if a change is identified, the UE may take corresponding actions, such as by modifying the downlink map 700. In certain aspects, this procedure is applicable for downlink data packets.

In certain aspects, for uplink data packets, the UE may rely on known traffic flow templates or filters provided by the non-access stratum (NAS) layer or reflective QoS (RQoS) to identify which radio bearer may carry an associated tuple. As such, the UE may derive the mapping between communication flows and radio bearers (bearer IDs) for both downlink and uplink traffic. The UE may modify some parameters associated with the specific radio bearer corresponding to the communication flow. For example, the parameter modification may include modifying RLC or PDCP reordering timers for downlink and RLC polling for uplink, or modification of other parameters as discussed.

In certain aspects, the UE may derive a bearer ID for the radio bearer as mapped to a tuple of the communication flow at a data layer of the UE (e.g., UE modem). The UE (e.g., UE modem) may use another independent feature, such as Reflective QoS, to obtain the tuple to downlink data radio bearer (DL DRB) mapping. In some cases, the UE may use 3GPP NAS RQoS features to derive a tuple to QoS Flow Identifier (QFI) mapping based on downlink traffic. In some cases, the UE may use 3GPP access stratum (AS) RQoS features to derive QFI to DRB mapping based on downlink traffic. In certain aspects, the UE may obtain a five-tuple mapping based on both NAS and AS RQoS features.

In certain aspects, the application may send a request for a low latency treatment to the UE (e.g., UE modem) using an API indication. For example, the API indication may indicate one or more of: the uplink IP flow(s) to handle, the downlink IP flow(s) to handle, or any other protocol identifier for the traffic of interest, such as Ethernet header information, presence of RTP, or the presence of Quick UDP Internet Connections (QUIC) traffic. The API indication may also indicate one or more of: the latency level requested for uplink, for the concerned bearer, the latency level requested for downlink, for the concerned bearer, or the activation of out of order delivery, for the concerned bearer.

Figure 8:
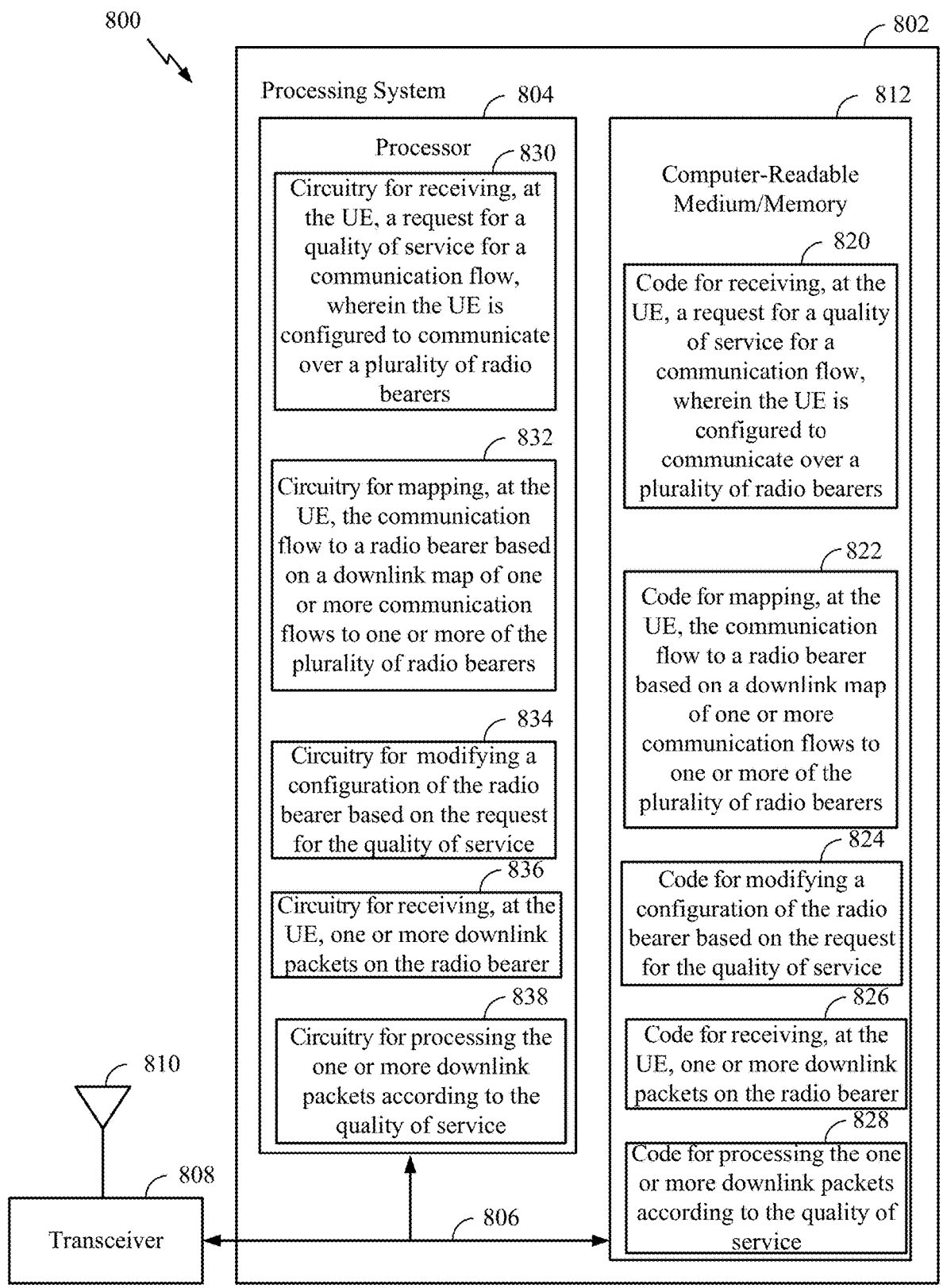
FIG. 8 illustrates a communications device that may include various components configured to perform operations for the techniques disclosed herein in accordance with aspects of the present disclosure.

FIG. 8 illustrates a communications device 800 that may include various components (e.g., corresponding to means-plus-function components) configured to perform operations for the techniques disclosed herein, such as the operations illustrated in FIG. 5. The communications device 800 includes a processing system 802 coupled to a transceiver 808 (e.g., a transmitter and/or a receiver). The transceiver 808 is configured to transmit and receive signals for the communications device 800 via an antenna 810, such as the various signals as described herein. The processing system 802 may be configured to perform processing functions for the communications device 800, including processing signals received and/or to be transmitted by the communications device 800.

The processing system 802 includes a processor 804 coupled to a computer-readable medium/memory 812 via a bus 806. In certain aspects, the computer-readable medium/memory 812 is configured to store instructions (e.g., computer-executable code) that when executed by the processor 804, cause the processor 804 to perform the operations illustrated in FIG. 5, or other operations for performing the various techniques discussed herein for providing QoS on a radio bearer associated with a communication flow for which an application requests QoS. In certain aspects, computer-readable medium/memory 812 stores code 820 for receiving, at the UE, a request for a quality of service for a communication flow, wherein the UE is configured to communicate over a plurality of radio bearers; code 822 for mapping, at the UE, the communication flow to a radio bearer based on a downlink map of one or more communication flows to one or more of the plurality of radio bearers; code 824 for modifying a configuration of the radio bearer based on the request for the quality of service, code 826 for receiving, at the UE, one or more downlink packets on the radio bearer, and/or code 828 for processing the one or more downlink packets according to the quality of service.

In certain aspects, the processor 804 has circuitry configured to implement the code stored in the computer-readable medium/memory 812. The processor 804 includes circuitry 830 for receiving, at the UE, a request for a quality of service for a communication flow, wherein the UE is configured to communicate over a plurality of radio bearers; circuitry 832 for mapping, at the UE, the communication flow to a radio bearer based on a downlink map of one or more communication flows to one or more of the plurality of radio bearers, circuitry 834 for modifying a configuration of the radio bearer based on the request for the quality of service, circuitry 836 for receiving, at the UE, one or more downlink packets on the radio bearer, and/or circuitry 838 for processing the one or more downlink packets according to the quality of service.

In certain aspects, means for transmitting (or means for outputting for transmission) may include a transmitter and/or an antenna(s) 234 of the BS 110a or the transmitter unit 254 and/or antenna(s) 252 of the UE 120a illustrated in FIG. 2. Means for receiving (or means for obtaining or means for measuring) may include a receiver and/or an antenna(s) 234 of the BS 110a or a receiver and/or antenna(s) 252 of the UE 120a illustrated in FIG. 2, circuitry 830 for receiving, at the UE, a request for a quality of service for a communication flow, and/or circuitry 836 for receiving one or more downlink packets on the radio bearer of the communication device 800 in FIG. 8. Means for communicating may include a transmitter, a receiver, or both. Means for mapping, means for modifying, means for processing, means for determining, means for taking action, means for determining, means for coordinating, and means for measuring may include a processing system, which may include one or more processors, such as the transmit processor 220, the TX MIMO processor 230, the receive processor 238, and/or the controller/processor 240 of the BS 110*a* or the receive processor 258, the transmit processor 264, the TX MIMO processor 266, and/or the controller/processor 280 of the UE 120*a* illustrated in FIG. 2, the circuitry 832 for mapping the communication flow to a radio bearer based on a downlink map of one or more communication flows to one or more of the plurality of radio bearers, the circuitry 834 for modifying a configuration of the radio bearer based on the request for the quality of service; and/or the circuitry 838 for processing the one or more downlink packets according to the quality of service, and/or the processing system 802 of the communication device 800 in FIG. 8.

Example Aspects

Aspect 1: A method for wireless communication by a user equipment (UE), the method comprising: receiving, at the UE, a request for a quality of service for a communication flow, wherein the UE is configured to communicate over a plurality of radio bearers; mapping, at the UE, the communication flow to one of the plurality of radio bearers based on a downlink map of one or more communication flows to one or more of the plurality of radio bearers; modifying a configuration of the one of the plurality of radio bearers based on the request for the quality of service; receiving, at the UE, one or more downlink packets on the one of the plurality of radio bearers; and processing the one or more downlink packets according to the quality of service.

Aspect 2: The method of Aspect 1, wherein at least one of the one or more downlink packets is of the communication flow.

Aspect 3: The method of Aspect 1 or 2, further comprising deriving, at the UE, the downlink map based on downlink traffic received at the UE.

Aspect 4: The method of Aspect 3, wherein deriving the downlink map comprises deriving a bearer ID for the one of the plurality of radio bearers as mapped to a tuple of the communication flow at a data layer of a modem of the UE.

Aspect 5: The method of Aspect 3, further comprising receiving, from a network, an uplink map that maps communication flows to radio bearers, wherein the downlink map is used for downlink traffic and the uplink map is used for uplink traffic.

Aspect 6: The method of any one of Aspects 1 to 5, further comprising updating the downlink map at the UE to map the communication flow to a second radio bearer based on downlink traffic received at the UE.

Aspect 7: The method of any one of Aspects 1 to 6, wherein the request for the quality of service comprises an indication of one or more of: a latency requirement for the one of the plurality of radio bearers or the communication flow, or a request to modify one or more parameters for processing of traffic for the communication flow.

Aspect 8: The method of Aspect 7, where the one or more parameters comprise one or more of: activation status of out of order delivery of packets of the one of the plurality of radio bearers or the communication flow, configuration for fast radio link control (RLC) polling for the one of the plurality of radio bearers or the communication flow, configuration for fast RLC status reporting for the one of the plurality of radio bearers or the communication flow, configuration for fast RLC retransmission for the one of the plurality of radio bearers or the communication flow, configuration for a Packet Data Convergence Protocol (PDCP) reordering timer for the one of the plurality of radio bearers or the communication flow, or configuration for an operation of data movement between a modem of the UE and a computing device running an application associated with the communication flow.

Aspect 9: The method of Aspect 8, wherein modifying the configuration comprises modifying one or more of: the activation status of out of order delivery of packets of the one of the plurality of radio bearers or the communication flow, the configuration for fast RLC polling for the one of the plurality of radio bearers or the communication flow, the configuration for fast RLC status reporting for the one of the plurality of radio bearers or the communication flow, the configuration for fast RLC retransmission for the one of the plurality of radio bearers or the communication flow, the configuration for a PDCP reordering timer for the one of the plurality of radio bearers or the communication flow, or the configuration for the operation of data movement.

Aspect 10: The method of any one of Aspects 1 to 9, wherein the one of the plurality of radio bearers is used for downlink traffic of the communication flow, wherein a second radio bearer is used for uplink traffic of the communication flow, and wherein the second radio bearer is associated with a second quality of service.

Aspect 11: The method of any one of Aspects 1 to 10, wherein the communication flow comprises an Internet Protocol (IP) flow or an Ethernet flow.

Aspect 12: A user equipment (UE) for wireless communications, comprising: a memory; and a processor coupled to the memory, the processor and the memory being configured to: receive a request for a quality of service for a communication flow, wherein the UE is configured to communicate over a plurality of radio bearers; map the communication flow to one of the plurality of radio bearers based on a downlink map of one or more communication flows to one or more of the plurality of radio bearers; modify a configuration of the one of the plurality of radio bearers based on the request for the quality of service; receive one or more downlink packets on the one of the plurality of radio bearers; and process the one or more downlink packets according to the quality of service.

Aspect 13: The UE of Aspect 12, wherein at least one of the one or more downlink packets is of the communication flow.

Aspect 14: The UE of Aspect 12 or 13, wherein the processor and the memory are further configured to derive the downlink map based on downlink traffic received at the UE.

Aspect 15: The UE of Aspect 14, wherein the processor and the memory being configured to derive the downlink map comprises the processor and memory being configured to derive a bearer ID for the one of the plurality of radio bearers as mapped to a tuple of the communication flow at a data layer of a modem of the UE.

Aspect 16: The UE of Aspect 14, wherein the processor and the memory are further configured to receive, from a network, an uplink map that maps communication flows to radio bearers, wherein the downlink map is used for downlink traffic and the uplink map is used for uplink traffic.

Aspect 17: The UE of any one of Aspects 12 to 16, wherein the processor and the memory are further configured to update the downlink map at the UE to map the communication flow to a second radio bearer based on downlink traffic received at the UE.

Aspect 18: The UE of any one of Aspects 12 to 17, wherein the request for the quality of service comprises an indication of one or more of: a latency requirement for the one of the plurality of radio bearers or the communication flow, or a request to modify one or more parameters for processing of traffic for the communication flow.

Aspect 19: The UE of Aspect 18, where the one or more parameters comprise one or more of: activation status of out of order delivery of packets of the one of the plurality of radio bearers or the communication flow, configuration for fast radio link control (RLC) polling for the one of the plurality of radio bearers or the communication flow, configuration for fast RLC status reporting for the one of the plurality of radio bearers or the communication flow, configuration for fast RLC retransmission for the one of the plurality of radio bearers or the communication flow, configuration for a Packet Data Convergence Protocol (PDCP) reordering timer for the one of the plurality of radio bearers or the communication flow, or configuration for an operation of data movement between a modem of the UE and a computing device running an application associated with the communication flow.

Aspect 20: The UE of Aspect 19, wherein the processor and the memory are further configured to modify one or more of: the activation status of out of order delivery of packets of the one of the plurality of radio bearers or the communication flow, the configuration for fast RLC polling for the one of the plurality of radio bearers or the communication flow, the configuration for fast RLC status reporting for the one of the plurality of radio bearers or the communication flow, the configuration for fast RLC retransmission for the one of the plurality of radio bearers or the communication flow, the configuration for a PDCP reordering timer for the one of the plurality of radio bearers or the communication flow, or the configuration for the operation of data movement.

Aspect 21: The UE of any one of Aspects 12 to 20, wherein the one of the plurality of radio bearers is used for downlink traffic of the communication flow, wherein a second radio bearer is used for uplink traffic of the communication flow, and wherein the second radio bearer is associated with a second quality of service.

Aspect 22: The UE of any one of Aspects 12 to 21, wherein the communication flow comprises an Internet Protocol (IP) flow or an Ethernet flow.

Aspect 23: A user equipment (UE) for wireless communications, comprising: means for receiving a request for a quality of service for a communication flow, wherein the UE is configured to communicate over a plurality of radio bearers; means for mapping the communication flow to one of the plurality of radio bearers based on a downlink map of one or more communication flows to one or more of the plurality of radio bearers; means for modifying a configuration of the one of the plurality of radio bearers based on the request for the quality of service; means for receiving, one or more downlink packets on the one of the plurality of radio bearers; and means for processing the one or more downlink packets according to the quality of service.

Aspect 24: The UE of Aspect 23, wherein at least one of the one or more downlink packets is of the communication flow.

Aspect 25: The UE of Aspect 23 or 24, further comprising means for deriving the downlink map based on downlink traffic received at the UE.

Aspect 26: The UE of Aspect 25, wherein the means for deriving the downlink map is configured to derive a bearer ID for the one of the plurality of radio bearers as mapped to a tuple of the communication flow at a data layer of a modem of the UE.

Aspect 27: The UE of Aspect 25, further comprising means for receiving, from a network, an uplink map that maps communication flows to radio bearers, wherein the downlink map is used for downlink traffic and the uplink map is used for uplink traffic.

Aspect 28: The UE of any one of Aspects 23 to 27, further comprising means for updating the downlink map at the UE to map the communication flow to a second radio bearer based on downlink traffic received at the UE.

Aspect 29: The UE of any one of Aspects 23 to 28, wherein the request for the quality of service comprises an indication of one or more of: a latency requirement for the one of the plurality of radio bearers or the communication flow, or a request to modify one or more parameters for processing of traffic for the communication flow.

Aspect 30: A non-transitory computer readable medium storing instructions that when executed by a user equipment (UE) cause the UE to: receive, at the UE, a request for a quality of service for a communication flow, wherein the UE is configured to communicate over a plurality of radio bearers; map, at the UE, the communication flow to one of the plurality of radio bearers based on a downlink map of one or more communication flows to one or more of the plurality of radio bearers; modify a configuration of the one of the plurality of radio bearers based on the request for the quality of service; receive, at the UE, one or more downlink packets on the one of the plurality of radio bearers; and process the one or more downlink packets according to the quality of service.

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIG. 5.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communication by a user equipment (UE), the method comprising:
   receiving, at the UE, a request for a quality of service for a communication flow, wherein the UE is configured to communicate over a plurality of radio bearers;
   deriving, at the UE, a map of one or more communication flows to one or more of the plurality of radio bearers;
   mapping, at the UE, the communication flow to one of the plurality of radio bearers based on the map;
   modifying a configuration of the one of the plurality of radio bearers corresponding to the communication flow to support the quality of service for the communication flow, wherein the modifying comprises modifying a first parameter corresponding to a radio link control (RLC) or packet data convergence protocol (PDCP) reordering timer associated with the one of the plurality of radio bearers for downlink traffic and a second parameter corresponding to RLC polling associated with the one of the plurality of radio bearers for uplink traffic;
   receiving, at the UE, one or more downlink packets on the one of the plurality of radio bearers; and
   processing the one or more downlink packets according to the quality of service.

2. The method of claim 1, wherein at least one of the one or more downlink packets is of the communication flow.

3. The method of claim 1, wherein deriving the map comprises deriving a bearer ID for the one of the plurality of radio bearers as mapped to a tuple of the communication flow at a data layer of the UE.

4. The method of claim 1, further comprising updating the map at the UE to map the communication flow from a first radio bearer of the plurality of radio bearers to a second radio bearer of the plurality of radio bearers.

5. The method of claim 1, wherein the request for the quality of service comprises an indication of one or more of:
   a latency requirement for the one of the plurality of radio bearers or the communication flow, or
   a request to modify one or more parameters for processing of traffic for the communication flow.

6. The method of claim 5, where the one or more parameters comprise one or more of:
   an activation status of an out of order delivery of packets of the one of the plurality of radio bearers or the communication flow,
   configuration for fast RLC polling for the one of the plurality of radio bearers or the communication flow,
   configuration for fast RLC status reporting for the one of the plurality of radio bearers or the communication flow,
   configuration for fast RLC retransmission for the one of the plurality of radio bearers or the communication flow,
   configuration for a PDCP reordering timer for the one of the plurality of radio bearers or the communication flow, or
   configuration for an operation of data movement between a modem of the UE and a computing device running an application associated with the communication flow.

7. The method of claim 6, wherein the modifying the configuration comprises modifying one or more of:
   the activation status of the out of order delivery of the packets of the one of the plurality of radio bearers or the communication flow,
   the configuration for fast RLC polling for the one of the plurality of radio bearers or the communication flow,
   the configuration for fast RLC status reporting for the one of the plurality of radio bearers or the communication flow,
   the configuration for fast RLC retransmission for the one of the plurality of radio bearers or the communication flow,
   the configuration for a PDCP reordering timer for the one of the plurality of radio bearers or the communication flow, or
   the configuration for the operation of data movement.

8. The method of claim 1, wherein a first radio bearer of the plurality of radio bearers is used for the downlink traffic of the communication flow, wherein a second radio bearer of the plurality of radio bearers is used for the uplink traffic of the communication flow, and wherein the second radio bearer is associated with a second quality of service.

9. The method of claim 1, wherein the communication flow comprises an Internet Protocol (IP) flow or an Ethernet flow.

10. A user equipment (UE) comprising:
   a memory comprising instructions; and
   one or more processors configured, individually or in any combination, to execute the instructions and cause the UE to:
      receive a request for a quality of service for a communication flow, wherein the UE is configured to communicate over a plurality of radio bearers;
      derive, at the UE, a map of one or more communication flows to one or more of the plurality of radio bearers;
      map the communication flow to one of the plurality of radio bearers based on the map;
      modify a configuration of the one of the plurality of radio bearers corresponding to the communication flow to support the quality of service for the communication flow, wherein the modify comprises modify a first parameter corresponding to a radio link control (RLC) or packet data convergence protocol (PDCP) reordering timer associated with the one of the plurality of radio bearers for downlink traffic and a second parameter corresponding to RLC polling associated with the one of the plurality of radio bearers for uplink traffic;
      receive one or more downlink packets on the one of the plurality of radio bearers; and
      process the one or more downlink packets according to the quality of service.

11. The UE of claim 10, wherein at least one of the one or more downlink packets is of the communication flow.

12. The UE of claim 10, wherein the one or more processors are configured, individually or in any combination, to execute the instructions and cause the UE to derive the map comprises the processor and the memory being configured to derive a bearer ID for the one of the plurality of radio bearers as mapped to a tuple of the communication flow at a data layer of the UE.

13. The UE of claim 10, wherein the one or more processors are configured, individually or in any combination, to execute the instructions and cause the UE to update the map at the UE to map the communication flow from a first radio bearer of the plurality of radio bearers to a second radio bearer of the plurality of radio bearers.

14. The UE of claim 10, wherein the request for the quality of service comprises an indication of one or more of:
   a latency requirement for the one of the plurality of radio bearers or the communication flow, or
   a request to modify one or more parameters for processing of traffic for the communication flow.

15. The UE of claim 14, where the one or more parameters comprise one or more of:
an activation status of the out of order delivery of the packets of the one of the plurality of radio bearers or the communication flow,
configuration for fast RLC polling for the one of the plurality of radio bearers or the communication flow,
configuration for fast RLC status reporting for the one of the plurality of radio bearers or the communication flow,
configuration for fast RLC retransmission for the one of the plurality of radio bearers or the communication flow,
configuration for a PDCP reordering timer for the one of the plurality of radio bearers or the communication flow, or
configuration for an operation of data movement between a modem of the UE and a computing device running an application associated with the communication flow.

16. The UE of claim 15, wherein the one or more processors are configured, individually or in any combination, to execute the instructions and cause the UE to modify one or more of:
the activation status of the out of order delivery of the packets of the one of the plurality of radio bearers or the communication flow,
the configuration for fast RLC polling for the one of the plurality of radio bearers or the communication flow,
the configuration for fast RLC status reporting for the one of the plurality of radio bearers or the communication flow,
the configuration for fast RLC retransmission for the one of the plurality of radio bearers or the communication flow,
the configuration for a PDCP reordering timer for the one of the plurality of radio bearers or the communication flow, or
the configuration for the operation of data movement.

17. The UE of claim 10, wherein a first radio bearer of the plurality of radio bearers is used for the downlink traffic of the communication flow, wherein a second radio bearer of the plurality of radio bearers is used for the uplink traffic of the communication flow, and wherein the second radio bearer is associated with a second quality of service.

18. The UE of claim 10, wherein the communication flow comprises an Internet Protocol (IP) flow or an Ethernet flow.

19. A user equipment (UE) comprising:
means for receiving a request for a quality of service for a communication flow, wherein the UE is configured to communicate over a plurality of radio bearers;
means for deriving, at the UE, a map of one or more communication flows to one or more of the plurality of radio bearers;
means for mapping the communication flow to one of the plurality of radio bearers based on the map;
means for modifying a configuration of the one of the plurality of radio bearers corresponding to the communication flow to support the quality of service for the communication flow, wherein the modifying comprises modifying a first parameter corresponding to a radio link control (RLC) or packet data convergence protocol (PDCP) reordering timer associated with the one of the plurality of radio bearers for downlink traffic and a second parameter corresponding to RLC polling associated with the one of the plurality of radio bearers for uplink traffic;
means for receiving one or more downlink packets on the one of the plurality of radio bearers; and
means for processing the one or more downlink packets according to the quality of service.

20. The UE of claim 19, wherein at least one of the one or more downlink packets is of the communication flow.

21. The UE of claim 19, wherein the means for deriving the map is configured to derive a bearer ID for the one of the plurality of radio bearers as mapped to a tuple of the communication flow at a data layer of the UE.

22. The UE of claim 19, further comprising means for updating the map at the UE to map the communication flow from a first radio bearer of the plurality of radio bearers to a second radio bearer of the plurality of radio bearers.

23. The UE of claim 19, wherein the request for the quality of service comprises an indication of one or more of:
a latency requirement for the one of the plurality of radio bearers or the communication flow, or
a request to modify one or more parameters for processing of traffic for the communication flow.

24. A non-transitory computer readable medium storing instructions that when executed by one or more processors of a user equipment (UE) configured, individually or in any combination, cause the UE to perform a method of wireless communications, comprising:
receive, at the UE, a request for a quality of service for a communication flow, wherein the UE is configured to communicate over a plurality of radio bearers;
derive, at the UE, a map of one or more communication flows to one or more of the plurality of radio bearers;
map, at the UE, the communication flow to one of the plurality of radio bearers based on the map;
modify a configuration of the one of the plurality of radio bearers corresponding to the communication flow to support for the quality of service for the communication flow, wherein the modify comprises modify a first parameter corresponding to a radio link control (RLC) or packet data convergence protocol (PDCP) reordering timer associated with the one of the plurality of radio bearers for downlink traffic and a second parameter corresponding to RLC polling associated with the one of the plurality of radio bearers for uplink traffic;
receive, at the UE, one or more downlink packets on the one of the plurality of radio bearers; and
process the one or more downlink packets according to the quality of service.

* * * * *